United States Patent Office 3,072,576
Patented Jan. 8, 1963

3,072,576
FERRITES HAVING RECTANGULAR HYSTERESIS LOOPS AND METHOD FOR MANUFACTURE OF SAME
Harold Greenhouse, Nashville, Tenn., assignor to Aladdin Industries, Incorporated, Nashville, Tenn., a corporation of Illinois
No Drawing. Filed May 27, 1958, Ser. No. 738,027
3 Claims. (Cl. 252—62.5)

This invention relates to crystalline ferrite structures having square or rectangular hysteresis loops.

It is an object of this invention to produce and to provide a method for producing a new and improved square looped-rectangular ferrite and it is a related object to produce magnetic cores of materials of the type described for use in devices having two stable states.

Another object is to produce and to provide a method for producing ferrites and structures embodying same having improved square loop hysteresis characteristics including improved rectangularity and very low coercive force and which are further characterized by increased homogeneity in the sintered product; high strength; and good stability, and it is a related object to provide a new and improved method and compositions for use in the manufacture of same.

Materials of the type described find use in the manufacture of square loop cores having bi-stable properties. Applications of particular importance are as magnetic material for memory devices including the torroids used in memory planes and stepping registers. Use can be made also as magnetic material in magnetic amplifiers using its non-linear characteristics, in gyrators, magnetic shift registers and the like.

Briefly described, compositions embodying the features of this invention include magnesium and manganese as essential components of the ferrite and zinc and/or titanium as components employed in combinations therewith to improve the rectangularity of the hysteresis loop and to reduce the coercive force amongst the more important of the electrical properties. Aside from the improvements in characteristics achieved by the formulations to include zinc and/or titanium, a further important concept of this invention resides in the method of processing the magnesium-manganese ferrite, alone or in combination with the zinc and/or titanium, to produce ferrite structures having improved characteristics from the standpoint of homogeneity, strength, flux density, stability and shrinkage.

For a fuller description, reference will be made to a composition representing the practice of this invention and to the method for the processing of same. It will be understood that the following formulation and processing steps are given by way of illustration and not by way of limitation.

Example 1

| Composition Materials | Mol percent | Percent by weight |
|---|---|---|
| $Fe_2O_3$ | 39.62 | 56.0 |
| $MnCO_3$ | 34.0 | 32.0 |
| $MgO$ | 20.0 | 7.0 |
| $ZnO$ | 6.0 | 4.0 |
| $PbTiO_3$ | 0.38 | 1.0 |

The ferric oxide ($Fe_2O_3$), which forms the base of the ferrite, should be present in an amount to form a stable ferrite with the other ingredients employed in combinations therewith. Thus the amount of ferric oxide can vary to some extent but it has been found that, when employed in amounts greater than 48 mol percent to less than 30 mol percent, the resulting ferrite is deficient in a number of respects. In the preferred practice of this invention, the amount of ferric oxide will range from 35–42 mol percent of the composition.

The magnesium component is preferably incorporated in the form of magnesium oxide or magnesium carbonate but it may also be incorporated in other forms reducible to the oxide in the composition. The amount of magnesium oxide can vary over fairly wide limits but it is essential to make use of more than 10 mol percent in the treating composition. It is undesirable to make use of an amount of magnesium oxide greater than 40 mol percent of the treating composition and optimum results are secured when the magnesium oxide or magnesium equivalent is present in an amount ranging from 15–25 mol percent of the treating composition.

The manganese component may be incorporated in the form of one of its oxides, such as manganous oxide ($MnO$), manganese dioxide ($MnO_2$), or manganous manganic oxide ($Mn_3O_4$) or in other forms reducible to an oxide. It is preferred, however, to incorporate the manganese component as the carbonate, such as manganese carbonate ($MnCO_3$) since the anion imparts a functionality in the composition which tends to flux the ferrite in a manner to accelerate the reaction in processing at lower temperatures. For this purpose, use can be made of the carbonate forms of others of the metallic components embodied in the ferrite composition, such as manganese carbonate, zinc carbonate, titanium carbonate, and the like when used. In the ferrite composition formulated in accordance with the practice of this invention, it is desirable to make use of an amount of manganese which, from the standpoint of mol percent, is greater than the magnesium component. Thus the amount of the manganese calculated on the basis of the carbonate may range up to a maximum of 45 mol percent of the composition. It is undesirable to make use of manganese carbonate or equivalent in an amount less than 10 mol percent. Within this range, best results are secured with an amount of manganese calculated on the basis of the carbonate within the range of 22–40 mol percent of the composition.

When incorporated as a component of the ferrite composition, the titanium tends to increase the ratio of $B_r$ to $B_s$ thereby to increase the rectangularity of the hysteresis loop. As used herein, the terms $B_r$ and $B_s$ are intended to have their usual meanings in the electrical art. Briefly degned, $B_r$ relates to the residual remanence magnitude of the loop, usually in terms of gauss, and $B_s$ relates to the saturated value of the flux, or saturated magnitude, also expressed in terms of gauss. The rectangularity is represented by the ratio of $B_r$ to $B_s$ with perfect rectangularity being secured when $B_r$ and $B_s$ are at the same level.

Best results are secured when the titanium, calculated as lead titanate, is present in an amount ranging from 0.15 to 0.75 mol percent, with a maximum of about 1.2 mol percent of the composition. While titanium is not essential to the manufacture of rectangular ferrites, the desirable effect of the rectangularity is observed when the lead titanate is present in the ferrite composition in an amount greater than 0.12 mol percent. Instead of lead titanate, the titanium component may be incorporated as the oxide or carbonate or in other forms reducible to the oxide to provide a corresponding amount of titanium. Though not equivalent, many of the described improvements secured by the use of titanium can also be obtained by the use of other divalent metals, as represented by zirconium. The latter may also be incorporated as a zirconate, such as lead zirconate, or as the oxide in amounts corresponding to the titanium component.

The zinc oxide has been found to be effective in the composition desirably to decrease the coercive force of the ferrite. The amount of zinc oxide added is quite critical because its function to decrease the coercive force must be balanced with the undesirable effect of the zinc to decrease rectangularity, especially when present in excessive amounts. It appears that zinc occupies a position in the lattice-crystal structure which is different than the other ferrite systems and that it is effective also to increase permeability which, in this particular instance, is not an essentially important characteristic of the rectangular ferrites.

Without zinc in the composition, the hysteresis loop is quite rectangular but the coercive force is somewhat higher than is desired. Good balance is achieved when zinc oxide is present in an amount within the range of 3–15 mol percent of the composition and preferably within the range of 4–7 mol percent. Again, while cadmium is not the equivalent of zinc, cadmium can be used in the oxide form or forms reducible to the oxide instead of zinc in corresponding amounts in the ferrite composition.

*Example 2*

| Materials | Broad range mol percent | Narrow range mol percent |
| --- | --- | --- |
| $Fe_2O_3$ | 30–48 | 35–42 |
| $MnCO_3$ | 22–45 | 30–40 |
| $MgO$ | 10–40 | 15–25 |
| $ZnO$ | 3–15 | 4–7 |
| Lead titanate | .12–1.2 | .15–.75 |

*Example 3*

Materials:                        Mol percent
- $Fe_2O_3$ — 42
- $MnCO_3$ — 33
- $MgO$ — 19
- $ZnO$ — 6

*Example 4*

Materials:                        Mol percent
- $Fe_2O_3$ — 42.5
- $MnCO_3$ — 36
- $MgO$ — 21
- $PbTiO_3$ — .5

As previously pointed out, an important concept of this invention also resides in a method of processing the materials to produce a new and improved composition, as illustrated by the following example which will be given with reference to the manufacture of a rectangular ferrite of the three component system but which applies equally to the manufacture of a ferrite of Examples 1–4.

*Example 5*

Composition:                     Mol percent
- $Fe_2O_3$ — 43
- $MnO$ — 37
- $MgCO_3$ — 20

Procedure: The ingredients are mixed dry and then the mixture is placed in a mill for reduction to a fine powder. Use can be made of a dry mill but it is preferred to make use of a wet grinding process in a ball mill. The wet powders are dried and screened. Materials less than 20 mesh are mixed about 10 percent by weight of a water soluble binder (Paisley 773 which has been diluted to 20–40% solids). The binders and powders are mixed with about 0.1–0.5 percent by weight of a lubricant, as represented by zinc stearate or other salt of a fatty acid, carbowax or the like, after which the materials are again mixed for distribution.

The mixture is pressed to shape and fired in a first firing step at a temperature of about 2480° F. for about 1½ hours. The product of the first firing step is cooled to about room temperature and then the material is subjected to a second firing step of 2500–2750° F. for from 1–3 hours. Upon removal from the second firing step, the material is rapidly cooled down to room temperature, as by means of an air quench.

The amount and type of binder or lubricant is of relatively little importance since the binder is only a fugitive binder which is removed upon firing and only enough is employed to hold the compacted material in the molded form until sintered by te firing steps. The lubricant is present only in small amounts to impart lubricity to the composition.

It will be noted that in the process, the firing step is subdivided as between a first firing step at about 2480° F. and a second firing step at a temperature within the range 2500–2750° F., with a cool-down step in between. While no explanation can as yet be given for the phenomenon which is secured, it has been found that the breakdown of the firing cycle in the manner described with a cool-down step in between is desirable from the standpoint of the shrinkage of the material. It is possible to treat the ferrite in a firing step by slowly heating the ferrite to 2500–2750° F. for from 1–3 hours and cooling rapidly to room temperature.

It is not necessary to cool down to room temperature between the first and second firing steps, but is desirable to carry the temperature down to a substantial degree from the firing temperature. The temperature in the first firing step can vary from 2250–2500° F. and the time can be varied in inverse proportion from 3–1 hours.

Another important difference in the process described resides in the quench, which is effected after the second firing step, rapidly to cool down the material. It has been found that while oxygen tends to be removed from the ferrite at the high temperature of firing, oxygen is reabsorbed in the ferrite upon cooling to give the ferrite properties which are undesirable from the standpoint of a square loop-rectangular ferrite. Desirable results are secured when the ferrite is cooled so fast from the firing temperature that the amount of oxygen taken up is kept to a minimum. An air quench, as described, is preferred over a water quench since the latter tends to embrittle the product, though a water quench can be used. Corresponding results can be secured by cooling the fired product more slowly in an inert atmosphere which is free or relatively free of oxygen.

A product prepared in accordance with the practice of this invention and embodying the composition as set forth in Example 1 is found to have the improved magnetic properties as follows:

| | |
| --- | --- |
| Initial permeability | 150 |
| Maximum permeability | 1400 |
| Saturation flux density, in gauss | 2000 |
| Retentivity, in gauss | 1860 |
| Coercive force, in oersteds | .92 |
| Switching time, in microseconds | .5–2.0 |
| $B_r$ to $B_s$ ratio | .93 |
| Maximum squareness ratio | .86 |
| Useful range of magnetomotive force, in oersteds | .8–2.4 |

It will be understood that changes may be made in the details of the formulation of the materials and in their method of processing without departing from the spirit of the invention, especially as defined in the following claims.

I claim:

1. A ferrite formed of a composition consisting essentially of 30–48 mol percent iron oxide, 10–45 mol percent manganese in the form of a compound selected from the group consisting of manganous oxide, manganous manganic oxide, manganese dioxide, manganese carbonate and compounds reducible to an oxide at elevated temperature, 10–40 mol percent magnesium in the form of a compound selected from the group consisting of magnesium oxide, magnesium carbonate and compounds reducible to an oxide at elevated temperature, and 3–15 mol percent zinc in the form of a compound selected from the group consisting of zinc carbonate, zinc oxide and compounds reducible to a zinc oxide at elevated temperature, said ferrite having been produced by the steps of mixing the materials in finely divided form, molding the mixed materials to a desired shape, firing the molded product in a first firing step to a temperature within the range of 2250–2500° F., cooling the material subsequent to the first firing step, reheating the material in a second firing step to a temperature within the range of 2500–2750° F., and then cooling the fired material to room temperature under substantially nonoxidizing conditions.

2. The ferite of claim 1 further including .12 to 1.2 mol percent titanium.

3. A ferrite formed of a composition consisting essentially of 30–48 mol percent iron oxide, 10–45 mol percent manganese in the form of a compound selected from the group consisting of manganous oxide, manganous manganic oxide, manganese dioxide, manganese carbonate and compounds reducible to an oxide at elevated temperature, and 10–40 mol percent magnesium in the form of a compound selected from the group consisting of magnesium oxide, magnesium carbonate and compounds reducible to an oxide at elevated temperature, said ferrite having been produced by the steps of mixing the materials in finely divided form, molding the mixed materials to a desired shape, firing the molded product in a first firing step to a temperature within the range of 2250–2500° F., cooling the material subsequent to the first firing step, reheating the material in a second firing step to a temperature within the range of 2500–2750° F., and then cooling the fired material to room temperature under substantially nonoxidizing conditions.

References Cited in the file of this patent

UNITED STATES PATENTS

| | | |
|---|---|---|
| 2,565,861 | Leverenz et al. | Aug. 28, 1951 |
| 2,568,881 | Albers-Schoenberg | Sept. 25, 1951 |
| 2,640,813 | Berge | June 2, 1953 |
| 2,736,708 | Crowley et al. | Feb. 28, 1956 |
| 2,929,787 | Eckert | Mar. 22, 1960 |
| 2,981,689 | Albers-Schoenberg | Apr. 25, 1961 |

FOREIGN PATENTS

| | | |
|---|---|---|
| 151,031 | Australia | Apr. 23, 1953 |
| 167,499 | Australia | Apr. 18, 1956 |
| 209,530 | Australia | July 29, 1957 |
| 697,219 | Great Britain | Sept. 16, 1953 |
| 737,284 | Great Britain | Sept. 21, 1955 |
| 1,128,209 | France | Aug. 26, 1956 |
| 514,217 | Canada | June 28, 1955 |
| 514,251 | Canada | June 28, 1955 |
| 554,116 | Italy | Jan. 7, 1957 |

OTHER REFERENCES

Economos: J. Amer. Ceramic Soc., July 1955, p. 242.

Gorter: Philips Res. Rep., December 1954, pp. 403–418.